Aug. 22, 1933.  I. D. PERRY  1,923,501
AIR VALVE AND THE LIKE
Filed Jan. 12, 1933

Inventor
Ira D. Perry
By
Attorney

UNITED STATES PATENT OFFICE 1,923,501

AIR VALVE AND THE LIKE

Ira D. Perry, Chicago, Ill., assignor to Agnes S. Perry, Chicago, Ill.

Application January 12, 1933. Serial No. 651,381

7 Claims. (Cl. 273—65)

This invention has to do with improvements in air valves and the like, especially intended for use in connection with inflated articles such as foot balls, basket balls, etc. It will presently appear, however, that the features of the invention are not necessarily limited to this or any other particular class of service.

One object of the invention is to provide an air valve made of rubber or other resilient material, and which air valve is so constituted that a very perfect sealing action is produced without the necessity of using special devices for air sealing condition. In this connection it is an object to so arrange the valve that the same naturally deflects into or assumes a closing and air sealing condition. In this connection it is an object to provide an air valve of resilient material such as rubber, having an air inflating portion, which portion naturally tends to close and seal itself due to the construction of the valve and resilience of the rubber or other material of which the valve is made.

In connection with the foregoing it is an object to provide an air valve construction in which the rubber disc or similar member is normally of a concavo-convex form, which member is necessarily warped or deflected into some other form when in the working condition, so that when in such working condition, the material of the valve member is naturally compressed firmly together at the position of the air passage portion, thus effectively sealing the same under pressure. In this connection the arrangement is such that when the air valve is placed in service and under inflation the material of the valve at the inside or high pressure end of the air passage is compressed together more solidly than when the valve is not in such working condition.

Another feature of the invention relates to the provision of a device of this character which is so constructed that it can be used either at the inside or the outside face of the bladder or diaphragm of the inflated article. That is to say, the air valve can be conveniently applied to either face of the diaphragm according to the dictates of convenience.

Another feature of the invention relates to the provision of an air valve embodying the above features and which is so constituted that it can be made from a minimum amount or quantity of rubber or other resilient material. In this connection, sometimes the valve member is made in the form of a circular disc, whereas at other times it may be still further reduced and made in the form of a relatively narrow and thin strip or rib.

Other objects and uses of the invention will appear from a detailed description of the same which consists in the features of construction and combinations of parts hereinafter described and claimed.

Figure 1:
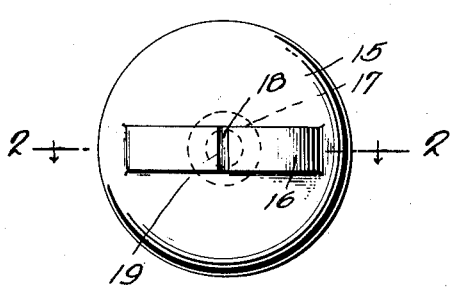
Figure 1 shows an inside face view of one form of valve embodying the feautres of the present invention.
Figure 2:
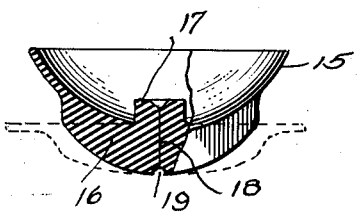
Figure 2 shows a cross section on the line 2—2 of Figure 1, looking in the direction of the arrows, showing the valve in its normal or concavo-convex form by full lines and in its deflected or working position by means of dotted lines.

Referring first to Figures 1 and 2, the valve arrangement therein illustrated includes a circular disc 15 of rubber or other similar material. This disc is of concavo-convex form when in its relaxed or natural condition. Extending across the inside or convex face of this disc there is a rib 16 which in the construction of Figures 1 and 2 terminates somewhat short of the edge of the circular disc 15. The rib 16 naturally conforms to the convex configuration of the disc 15 and therefore itself naturally has a convex surface. Preferably there is a lug 17 reaching outwardly from the concave face of the disc at the position of the rib 16.

The valve member so far described may be conveniently moulded or otherwise formed, during which operation the material thereof naturally assumes and retains the concavo-convex form illustrated. After the valve member has thus been moulded, a fine air passage 18 is punched through the valve member at the position of the lug 17, this operation being performed by a suitable tool such as a fine needle. Preferably the lug 16 is moulded with a notch or recess 19 at its central portion which becomes the center of the inside surface of the valve member when in use. The passage 18 is punched through at such position as to register with this recess or notch 19.

The natural resiliency of the rubber or other material ensures a very effective sealing action of the passage 18, but when the valve member is warped into the flat form shown by dotted lines in Figure 2 it will be evident that the inner end of the passage 18 is very much more effectively pinched together than was initially the case, because the material of the rib 16 is by this operation still more effectively crowded together due to the warping operation. This action is manifest since the fibres of the device are placed in compression at the inside of the neutral plane on which the bending takes place. Such being the case the sealing action is greatly improved by the very operation of inflating the device and causing it to be straightened out.

Furthermore the sealing action above referred to is still further improved by the presence of the notch or recess 19 at the terminal end of the passage 18. This notch brings the fibres of the rib 16 to a very sharp edge at the inner end of the passage 18 and also provides a surplusage of web or rib material at and immediately beyond the inner end of the passage 18, so that as the device is straightened out this material tends to crowd more effectively around the inner end of the passage 18 and thus still further enhances the sealing action at said inner end.

Manifestly the valve shown in Figures 1 and 2 may be applied to either the inner or outer surface of the bladder or other air tight article, since said bladder can be cemented to the disc 15 around the entire periphery past the web or rib 16.

Figure 3:
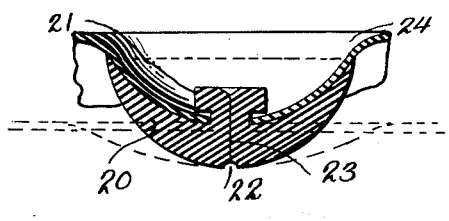
Figure 3 shows a view similar to that of Figure 2 with the exception that the rib is carried clear across to the edge of the circular disc, and also the valve is shown as being applied to the internal surface of the bladder, the parts being shown in their normal or concavo-convex form by full lines and in the warped or inflated form by means of dotted lines.
Figure 4:
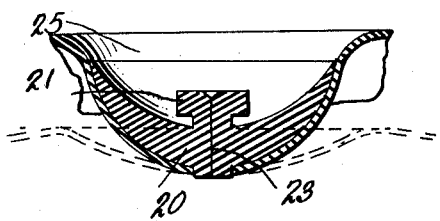
Figure 4 shows a view similar to that of Figure 3 with the exception that the valve has been applied to the external surface of the bladder.

The arrangement shown in Figures 3 and 4 differ from that so far described in the sense that the web or rib 16 is dispensed with and the circular disc 20 is continuous around the circle at all points. That is to say the body portion of the valve member comprises a circular disc 20 of tapering thickness, thickest in its central portion and tapering to a fine edge at its periphery. This device is also preferably provided with a central lug 21 reaching outwardly from its concave surface and with a notch or recess 22 at the central portion of its convex surface, so that the air passage 23 extends between the lug 21 and said notch or recess 22. The device normally assumes the curved form shown in Figures 3 and 4, but may be bent or warped into the dotted line form shown in said figures.

In Figure 3 the device is shown as being applied and cemented to the interior surface of the bladder 24, whereas in Figure 4 it is shown as applied to the exterior surface of the bladder 25.

Figure 6:
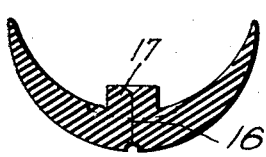
Figure 6 shows a cross section on the line 6—6 of Figure 5, looking in the direction of the arrows.
Figure 5:
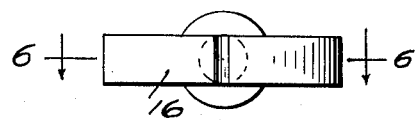
Figure 5 shows a view similar to that of Figure 1, but illustrating another modified form of device in which the circular disc has been substantially eliminated and the valve member is substantially resolved into a narrow strip or rib.

The arrangement of Figures 5 and 6 is similar to that of Figures 1 and 2 with the exception that the major portion of the circular disc 15 has been eliminated and the device has been resolved substantially into the simple form of a narrow rib or lug 16.

I wish to make it clear that in each of these devices the inner end of the through air passage is normally sealed by a severe pinching action occasioned by the compression of the material at an adjacent point to the inner end of said passage, which compression is brought about by the deflection of the rubber or resilient material into a compressing condition at that point. Such an arrangement is clearly to be distinguished from one in which the sealing action of the passage is enhanced merely by a direct lateral pressure exerted on the body of the material at the sides of the passage since such direct lateral pressure must necessarily be very much larger in total amount than that necessary to pinch the end portion of the passage; and also for the reason that where the pinching action is produced merely in the end portion of the passage it is produced at an angle to the axis of the passage as distinguished from being directly at right angles to said axis.

I also wish to make it clear that in each of the arrangements herein illustrated it is contemplated that the inflation and deflation shall be produced by the use of a small tubular tool inserted through the air passage and communicating with the interior of the article to be inflated or deflated.

While I have herein shown and described only certain embodiments of the features of my present invention, still I do not intend to limit myself thereto except as I may do so in the claims.

I claim:

1. As a new article of manufacture a valve for an inflated article comprising a moulded rubber member which is normally of generally concavo-convex form and has a relatively thick central portion having a central notch or recess in its convex face, there being a fine through passage extending through the relatively thick portion aforesaid and terminating within said notch or recess, the concavo-convex construction of said valve when attached to a flexible inflatable article normally deflecting and bending the adjacent material of said article inwardly when deflated, said valve member being flattened on inflation of said article into a position to place the material of its convex face portion under compression and seal the through passage at the position of the notch or recess aforesaid, substantially as described.

2. As a new article of manufacture a valve member for an inflated article comprising a circular concavo-convex disc of moulded rubber of thickness tapering from a maximum thickness in its central portion to a relatively thin edge portion, there being a notch or recess in the central portion of the convex surface of said member and there being a relatively fine through passage extending through the member and terminating at the position of said notch or recess, the material of said valve member being normally relaxed at the convex surface aforesaid and the valve member being deformed when in service on an inflated article in a direction to place the material of its convex portion under compression at the position of the inner end of said through passage to thereby effectively seal the same, substantially as described.

3. As a new article of manufacture a valve member for an inflated article comprising a concavo-convex disc of moulded rubber having a transversely extending rib across its convex surface portion, said rib terminating inwardly of the peripheral edge of the disc, there being a fine through passage extending through the central edge portion of the disc and rib, the valve member including the rib being deformed when in service on an inflated article in a direction to place the rib material under compression at the convex end of the through passage to thereby effectively seal the same, substantially as described.

4. As a new article of manufacture a valve member for an inflated article comprising a concavo-convex disc of moulded rubber having a transversely extending rib across its convex surface, there being a fine through passage extending through the central thick portion of the disc and rib, the valve member including the rib being deformed when in service on an inflated article in a direction to place the rib material under compression at the adjacent end of the through passage to thereby effectively seal the same, substantially as described.

5. In a wall structure for inflatable articles, an air valve comprising a resilient article inflating portion having laterally tapered rib portions connected to the wall of said article and normally extending at acute angles to a medial line between said portions, said rib portions being laterally deflectable by the wall of said article upon inflation thereof to compress the inflating portion of said valve.

6. An air valve for inflatable articles comprising a resilient body having a centrally disposed inflating lug portion projecting from one side thereof adapted to be inserted through an opening in the article wall and laterally and angularly extending side portions adapted to be attached to the wall of the article to each side of the opening therein, whereby upon inflation of said article said side portions are laterally deflected to compress the material of said inflating portion therebetween.

7. An air valve for inflatable articles comprising a resilient body having an article inflating portion having an inflating passage therethrough to the sides of which are formed angularly extending article attaching portions adapted for attachment to the inflatable article, said last mentioned portions being laterally spaced and radially tapered, whereby upon inflation of said article said tapered portions are deflected laterally to compress the intermediate material of said inflating portion and close the inflating passage.

IRA D. PERRY.

CERTIFICATE OF CORRECTION.

Patent No. 1,923,501.                              August 22, 1933.

IRA D. PERRY.

It is hereby certified that error appears in the printed specification of the above numbered patent requiring correction as follows: Page 1, line 13, strike out the words "air sealing condition" and insert instead "closing the air passage"; and that the said Letters Patent should be read with this correction therein that the same may conform to the record of the case in the Patent Office.

Signed and sealed this 26th day of September, A. D. 1933.

F. M. Hopkins (Seal)                                   Acting Commissioner of Patents.